United States Patent [19]

Kasai

[11] 4,202,294
[45] May 13, 1980

[54] AUTOMATIC WATER SUPPLY SYSTEM FOR BREEDING OR RAISING ANIMALS

[76] Inventor: Nobuharu Kasai, 32, Aza Ipponyanagi, Oaza Tanuma, Onoemachi, Minamitsugaru-gun, Aomori-ken, Japan

[21] Appl. No.: 891,172

[22] Filed: Mar. 29, 1978

[30] Foreign Application Priority Data

Mar. 31, 1977 [JP] Japan .................. 52/37062

[51] Int. Cl.² ................................ A01K 7/04
[52] U.S. Cl. ........................... 119/78; 119/80
[58] Field of Search .............. 119/78, 79, 80, 77, 119/72; 137/135

[56] References Cited

U.S. PATENT DOCUMENTS

| | | | |
|---|---|---|---|
| 1,590,321 | 6/1926 | Sartakoff | 137/135 X |
| 2,791,984 | 5/1957 | Franklin | 119/77 X |

*Primary Examiner*—Hugh R. Chamblee
*Attorney, Agent, or Firm*—Norbert P. Holler; Bert J. Lewen

[57] ABSTRACT

An automatic water supply system used for raising domestic animals such as cattle, horses, poultry and so on and especially for pigs. Instead of a water flow control device such as a valve, float or the like provided in a self supply water trough, a flow control container is used which is communicated through a water supply pipe to a common water storage tank, placed at an elevated position inaccessible to a pig or the other animals and includes a float, a valve and a siphon which may ensure the automatic and positive supply of water into the trough as the water level in the trough is lowered by an animal drinking therefrom. Therefore the unnecessary supply of water caused by the undesired engagement of the mouth of an animal with the water flow control device in the trough mischieviously, and/or the stopping up of the drain with remaining food particles may be completely eliminated.

3 Claims, 11 Drawing Figures

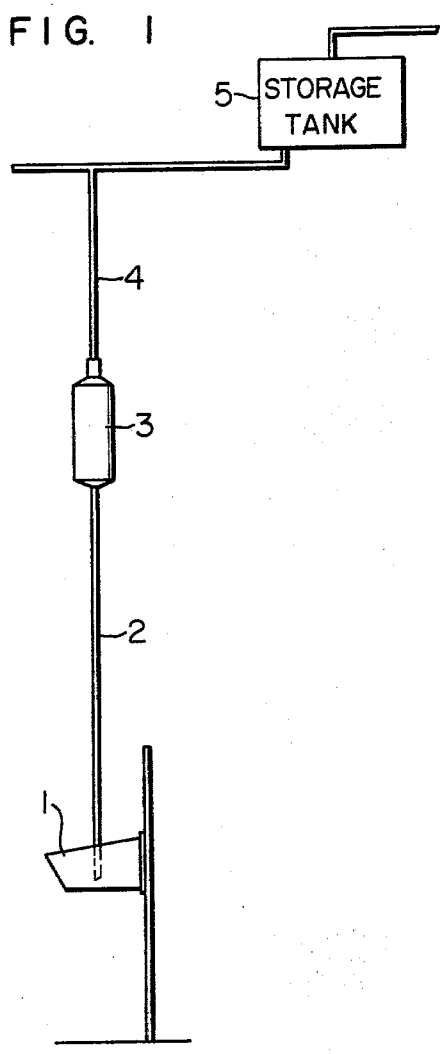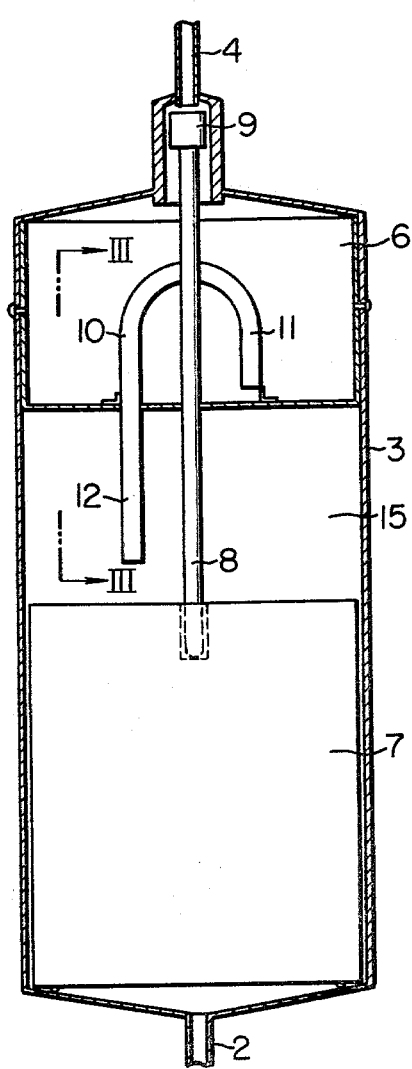

FIG. 6a  FIG. 6b  FIG. 6c  FIG. 6d
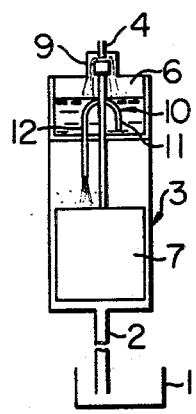
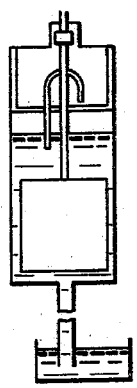
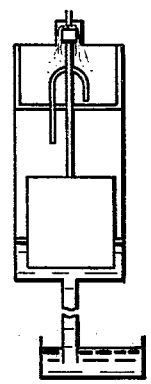
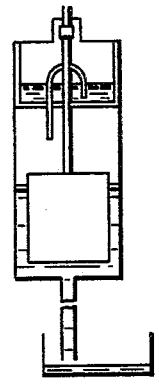
FIG. 7
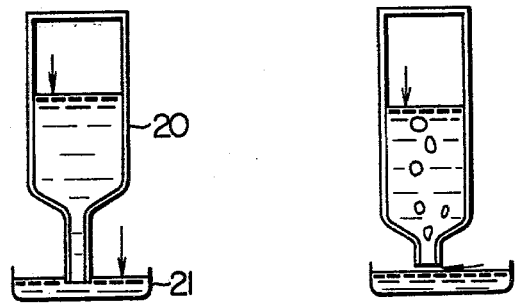

AUTOMATIC WATER SUPPLY SYSTEM FOR BREEDING OR RAISING ANIMALS

The present invention relates to an improvement of a system for automatic supply of water to animals and especially pigs.

In the prior art automatic water supply system of the type described, a water flow control means such as a valve, a float or the like is installed within or adjacent to a water feeding trough or the like. Therefore the malfunction of the automatic water supply system frequently occurs due to the unnecessary engagement of an animal's mouth with such a water flow control means by mischief or the like. That is, an animal such as a pig often touches and thus opens a valve by mere mischief alone, also dregs of animals feed stop up a drain passage when an excess water flows down without being drunk by the animal.

Accordingly, one of the objects of the present invention is to provide an automatic water supply system used for raising domestic animals which may completely remove a water flow control means such as a valve, a float or the like from a self supply water trough or the like and which may ensure the efficient supply of water to supplement the amount of water actually drunk by the animal into a trough through a water feed pipe by the use of a flow control container which is placed at an elevated position inaccessible to an animal, which includes a stop valve, a float and a siphon for controlling the water flow to the trough.

The above and other objects, features and advantages of the present invention will become more apparent from the following description of one preferred embodiment thereof taken in conjunction with the accompanying drawings.

FIG. 1 is a schematic side view of an automatic water supply system in accordance with the present invention;

FIG. 2 is a sectional view in elevation on an enlarged scale of a flow control container including a float, a valve and a siphon.

FIGS. 6a, 6b, 6c and 6d are views for showing the mode of operation; and

FIG. 7 is a view used for explanation of the principle of the present invention.

Figure 3:
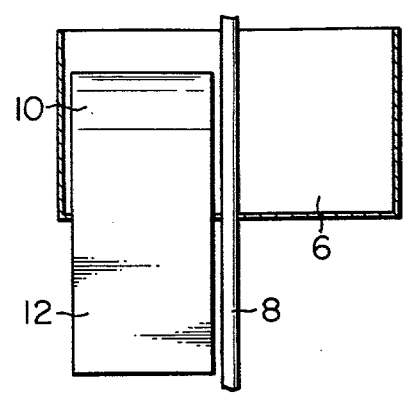
FIG. 3 is a left side view taken along line III—III of FIG. 2, showing mainly the siphon and the control chamber.

Referring to the accompanying drawings and particularly to FIG. 1, a preferred embodiment of an automatic water supply system for raising animals in accordance with the present invention comprises a water storage tank 5 disposed at an elevated place, water supply pipes 4 for supplying the water stored in the storage tank 5 into a plurality of flow control containers 3 and a plurality of self supply water vessels or troughs 1 each communicated with the corresponding flow control container 3 through a water feed pipe 2.

Figure 5A:
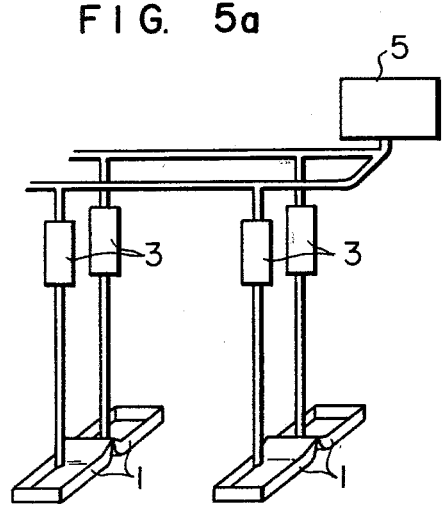
FIG. 5a is a fragmentary perspective view of the water supply system in accordance with the present invention.

As best shown in FIG. 5a, within an open or closed housing for, for example pig raising, a pair of self supply water troughs 1 may be placed in back-to-back relationship and can be communicated through the water feed pipes 2, the flow control containers 3 and the water supply pipes 4 with the water storage tank 5, but it is to be understood that the present invention is not limited to this type of distribution system.

Figure 5B:
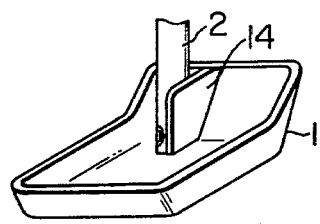
FIG. 5b is a perspective view of a self supply water trough-like vessel.

The flow control container 3 must be placed at an elevated position which is inaccessible to pigs or the like. The outlet of the water feed pipe 2 opening into the self supply water trough 1 may be surrounded by a protective wall 14 or the like as shown in FIG. 5b so that the outlet may be prevented from being touched by the mouth of the pig.

Figure 4:
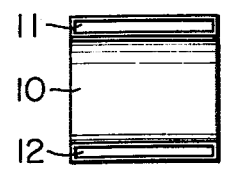
FIG. 4 is a bottom view of the siphon.

Referring to FIGS. 2, 3 and 4, the flow control container 3 is divided into an upper chamber or a control chamber 6 and a lower or float chamber 15. The control chamber 6 is communicated with the water supply pipe 4 through a short, upright hollow cylindrical neck 13 extended from the top of the flow control container 3 while the float chamber 15 is communicated through the water feed pipe 2 with the self supply water trough 1. A float 7 which is placed in the float chamber 15 is connected to a valve body 9 in the hollow cylindrical neck 13 with a valve rod 8, whereby the inflow of water into the control chamber 6 is permitted or interrupted as the valve body 9 is moved away from, to open, or toward, to shut, the outlet of the water supply pipe 4 depending upon the position of the float 7 which in turn is dependent upon the level of water within the float chamber 15.

The control chamber 6 and the float chamber 15 are intercommunicated with a siphon tube 10 having an inverted J shape and a cross section of elongated oval or rectangular shape. The short leg 11 of the siphon tube 10 is placed within the control chamber 6 and the inlet of the siphon tube 10, namely, the lower end of the short leg 11 is spaced apart from the bottom of the control chamber 6 by a small distance. The long leg 12 is extended through the bottom of the control chamber 6 into the float chamber 15 and has an outlet opening at the lower end thereof.

Next the mode of operation of the automatic water supply system with the above construction will be described. Assume that the water in the float chamber 15 has been discharged such that the float 7 rests on the bottom of the float chamber and consequently the valve body 9 has been moved away from the outlet of the water supply pipe 4 as shown in FIG. 2. Then, as shown in FIG. 6a, the water is able to flow into the control chamber 6 from the water storage tank 5 through the water supply pipe 4. When the level of the water stored in the control chamber 6 rises just above the top of the siphon tube 10, the water in the control chamber 6 is immediately caused to flow into the float chamber 15 through the siphon tube 10 due to its siphon effect. When the level of the water in the control chamber 6 drops below the inlet of the siphon tube 10, namely, the lower end of the short leg 11, the inflow of the water from the control chamber 6 into the float chamber 15 is interrupted. As the water level in the float chamber 15 rises, it raises the float 7 so that the valve body 9 shuts the outlet of the water supply pipe 4, and consequently, the inflow of the water into the control chamber 6 is interrupted. The water in the float chamber 15 flows down through the water feed pipe 2 into the self water supply trough 1 so that the level of the water in the trough 1 rises above the outlet of the water feed pipe 2. At this stage the water is distributed as shown in Fig. 6b In this state, the condition within and below the flow control container 3 is substantially similar to that of a bottle 20 which is filled with water and turned upside down with its neck dipped in the water in a pan-like vessel 21 as shown in Fig. 7. The atmospheric pressure acting upon the water in the pan-like vessel 21 is equal to the sum of the head of the water in the bottle 20 plus the pressure of the air trapped in the bottle 20 and which is lower than the atmospheric pressure so that the outflow of water from the bottle 20 may be prevented due to the balance of pressures. When the level of the water in the pan-like vessel 21 lies below the outlet of the bottle 20, a small amount of air will flow into the bottle 20 while a corresponding amount of water flows out into the pan-like vessel 21 until the level of the water in the pan-like vessel 21 rises slightly above the outlet of the bottle 20; that is, until equilibrium is reached between the atmospheric pressure and the sum of the water head in the bottle 20 plus the pressure of the air entrapped therein. The same is true for the flow control container 3, the water feed pipe 2 and the self supply water trough 1 shown in Fig. 6b. That is, equilibrium is reached between the atmospheric pressure and the sum of the head of the water in the flow control container 3 plus the water head in the feed pipe 2 plus the pressure of the air entrapped in the float chamber 15.

Therefore, as long as the water level in the self supply water trough 1 is above the outlet of the water feed pipe 2, no water is permitted to flow down from the float chamber 15 into the trough 1. When a pig or the like animal drinks the water in the trough 1 so that the level of the water in the trough 1 drops below the outlet of the water feed pipe 2, as shown in Fig. 6d some volume of air flows into the float chamber 15 through the water feed pipe 2 so that corresponding amount of water flows out from the floating chamber 15 into the trough 1 until the above described equilibrium condition is reached.

When the level of the water in the float chamber 15 drops below a predetermined level, the float 7 is lowered so that the valve body 9 is moved down away from the position shutting the outlet of the water supply pipe 4, and consequently, the water flows into the control chamber 6 as shown in Fig. 6a in the manner described above. These steps are cycled repeatedly as the water in the vessel is consumed.

As is apparent from the above description, the water supply system in accordance with the present invention may completely eliminate such drawbacks as the provision of a valve, a float or the like within a water supply trough as used in prior art, so that the problems of waste of water due to mischief by the animals caused by the use of such conventional water flow control means may be overcome. Furthermore the automatic and positive supply of the water into the trough may be ensured with the use of the flow control unit which is installed at an elevated position inaccessible to a pig or the like animal and which has a unique pressure balance construction including a siphon tube, a float and a valve functionally interconnected as described above.

What is claimed is:

1. An automatic water supply system for raising animals which comprises:
   (a) a water storage tank;
   (b) a water supply pipe connected to said water storage tank;
   (c) a self-supply water trough;
   (d) a flow control container having:
      (i) a control chamber forming the upper part of said container and being connected with said water supply pipe;
      (ii) valve means located in said control chamber and controlling the communication between said water supply pipe and said control chamber;
      (iii) a float chamber forming the lower part of said container;
      (iv) a float in said float chamber, said float having a valve activating rod which extends upwardly therefrom and passes through the bottom of said control chamber and which is adapted to open and close said valve means, said valve means thereby responding to the water level in said float chamber, so as to regulate the inflow of water from said water storage tank through said water supply pipe into said control chamber; and
      (v) an inverted J-shape siphon having an elongated rectangular or oval cross-section; said siphon connecting said control chamber and said float chamber, the open end of the short leg of said siphon being spaced above the bottom of said control chamber by a small predetermined distance, while the long leg of said siphon is extended through the bottom of said control chamber into said float chamber; and
   (e) a water feed pipe, the lower end of which is placed in said self-supply water trough at a suitable distance above the bottom thereof and the upper end of which is connected to the bottom of said float chamber.

2. The automatic water supply system of claim 1 wherein the lower end of the water feed pipe is positioned in said self-supply water trough at the side opposite to the side at which the animal has access to said trough and wherein at least one protective wall means is provided to prevent said animal from contacting the lower end of said water feed pipe.

3. The automatic water supply system of claim 1 wherein a plurality of water supply pipes are extended from said water storage tank, each such water supply pipe feeding a separate flow control container, each said flow control container feeding a separate water feed pipe, and each said water feed pipe feeding a self-supply water trough; and wherein said troughs are arranged in alignment with one another or faced opposite to each other.

* * * * *